Figure 1:
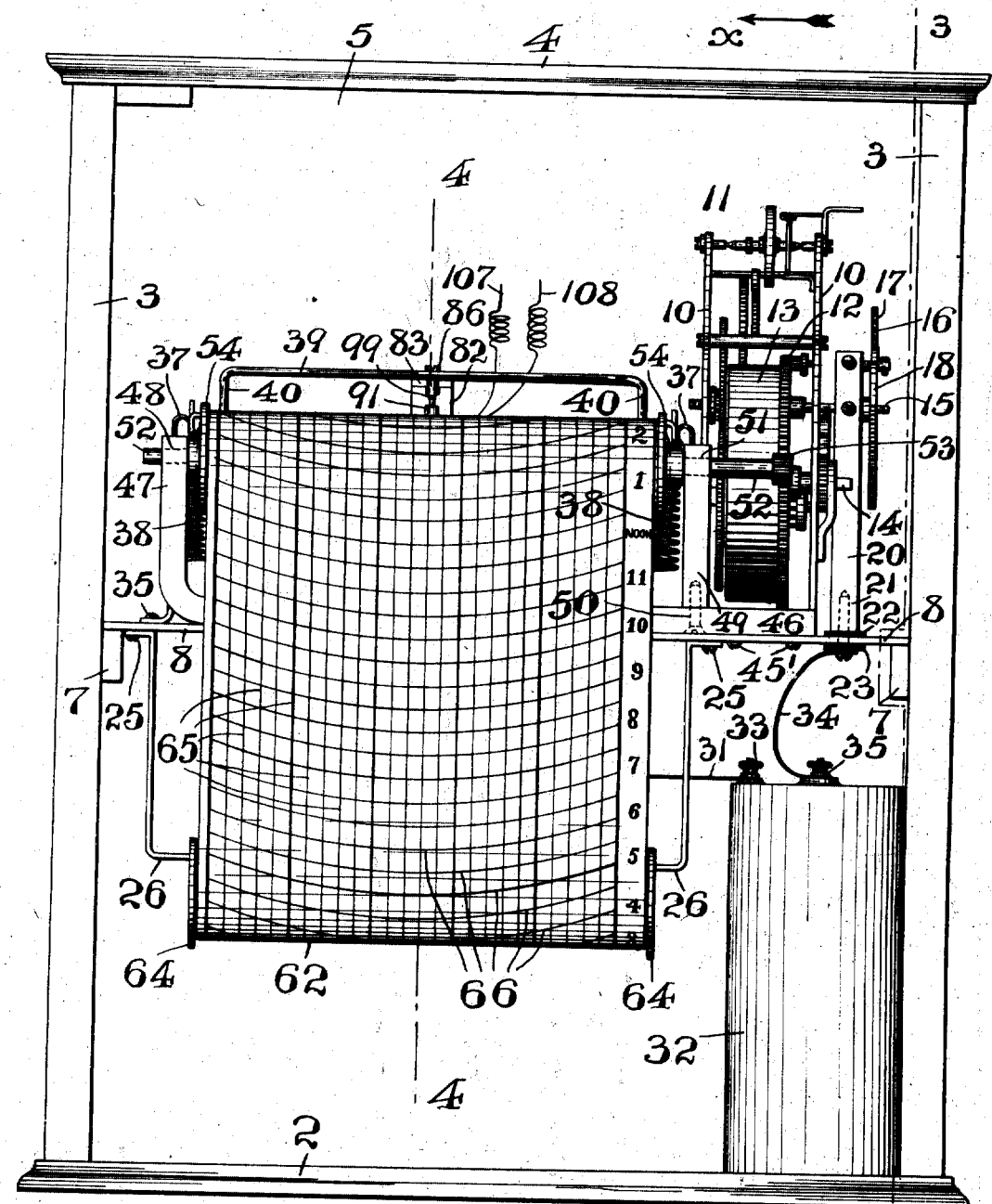

J. L. ZANDER.
RECORDING INDICATOR.
APPLICATION FILED MAR. 30, 1910.

993,935.

Patented May 30, 1911.
6 SHEETS—SHEET 4.

WITNESSES:
Fredk. C. W. Fraentzel
Anna H. Alten

INVENTOR:
John L. Zander,
BY Fraentzel and Richards,
ATTORNEYS

J. L. ZANDER.
RECORDING INDICATOR.
APPLICATION FILED MAR. 30, 1910.

993,935.

Patented May 30, 1911.
6 SHEETS—SHEET 5.

WITNESSES:
Fredk. W. Fraentzel
Anna H. Alter

INVENTOR:
John L. Zander,
BY Fraentzel and Richards,
ATTORNEYS

J. L. ZANDER.
RECORDING INDICATOR.
APPLICATION FILED MAR. 30, 1910.

993,935.

Patented May 30, 1911.
6 SHEETS—SHEET 6.

WITNESSES:
Fred'k H. W. Fraentzel
Anna H. Acter

INVENTOR:
John L. Zander
BY Fraentzel and Richards
ATTORNEYS

UNITED STATES PATENT OFFICE.

JOHN L. ZANDER, OF NEWARK, NEW JERSEY.

RECORDING-INDICATOR.

993,935.    Specification of Letters Patent.    Patented May 30, 1911.

Application filed March 30, 1910. Serial No. 552,385.

*To all whom it may concern:*

Be it known that I, JOHN L. ZANDER, a citizen of the United States, residing at Newark, in the county of Essex and State of New Jersey, have invented certain new and useful Improvements in Recording-Indicators; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in electrical recording apparatus or indicators; and, the present invention relates, more particularly, to a novel and simply constructed electrical recording indicator, in which the recording stylus is moved electrically, but the mechanism for operating a record sheet being controlled by mechanical means.

The present invention has for its principal object to provide a novel and simple construction of recording indicator, which is most efficient in its operation, and in which a swinging stylus or marker is intermittently arrested in its movement, at suitable predetermined intervals of time, such as seconds, minutes, etc., the spring-like rod or arm of the stylus being forced downwardly and for the time being immovably fixed, by electro-magnetic attraction, the coils of the electro-magnets being intermittently energized, by means of a make and break device in the form of a suitable clock-mechanism, substantially in the manner hereinafter more particularly set forth.

Other objects of this invention not at this time more particularly enumerated will be clearly understood from the following detailed description of the present invention.

With the various objects of the present invention in view, the said invention consists, primarily, in the novel electrical recording-indicator hereinafter more fully set forth; and, the invention consists, furthermore, in the novel arrangements and combinations of the various devices and parts, as well as in the details of the construction of the same, all of which will be more fully described in the following specification, and then finally embodied in the clauses of the claim which are appended to and which form an essential part of this specification.

The invention is clearly illustrated in the accompanying drawings, in which:—

Figure 2:
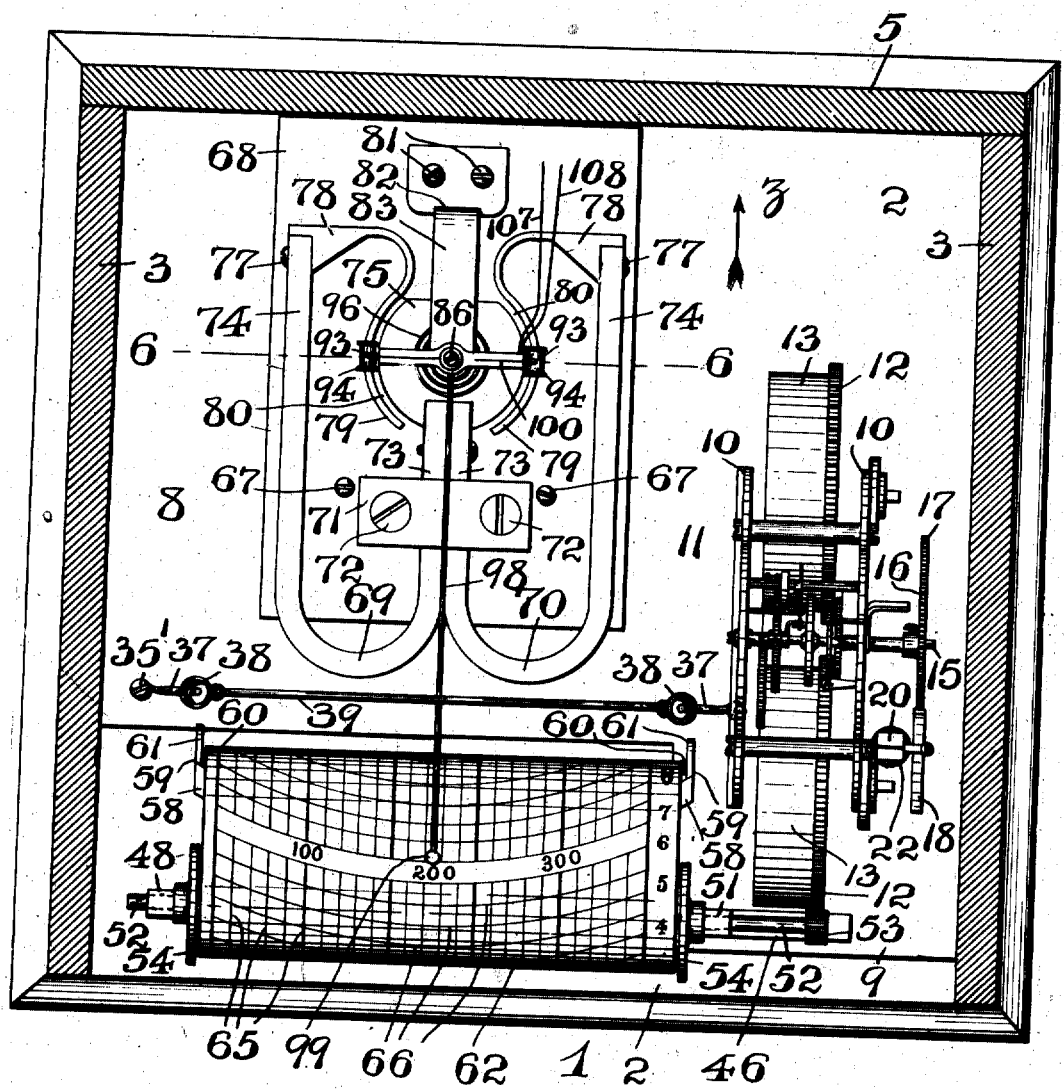
Figure 3:
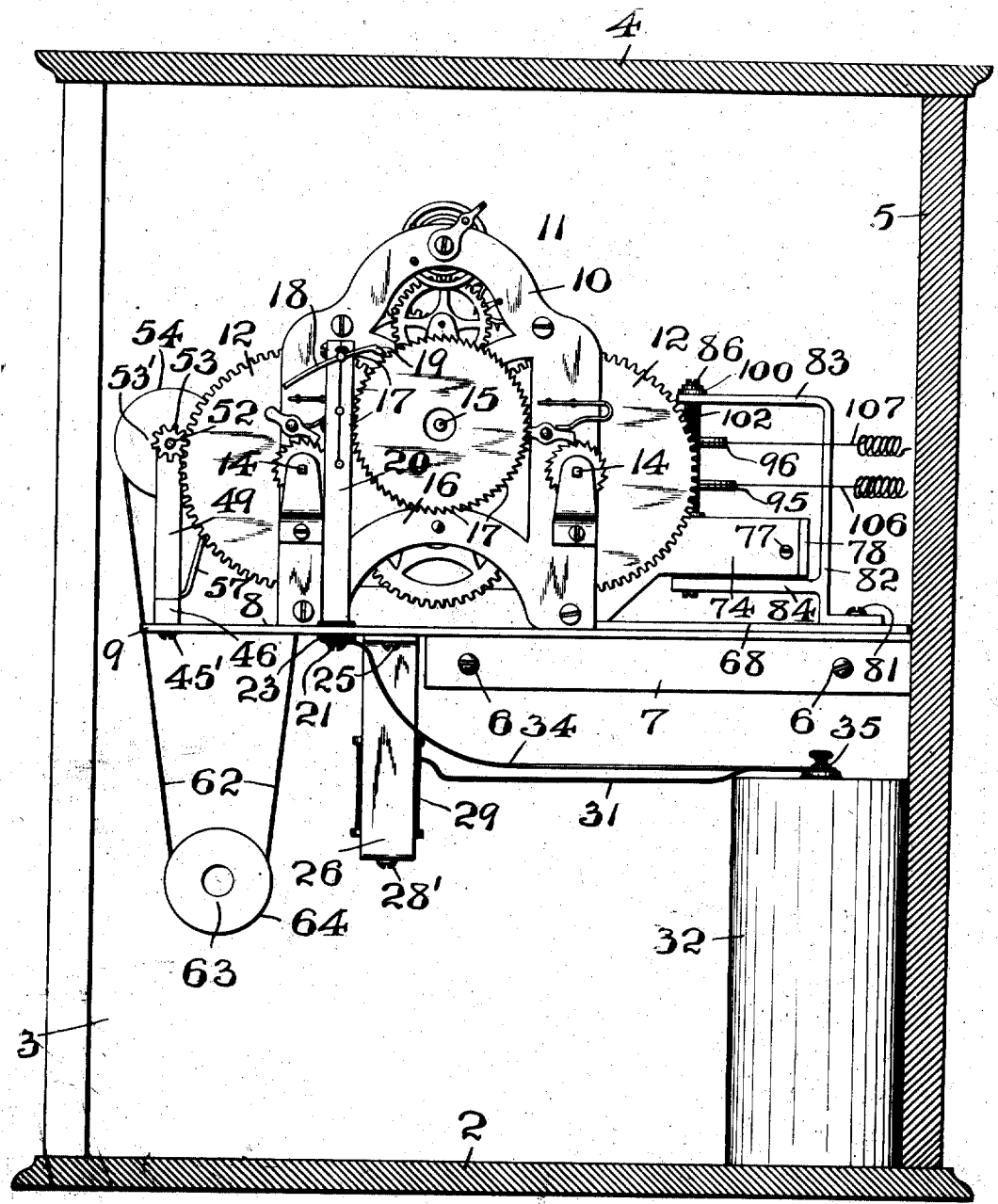
Figure 4:
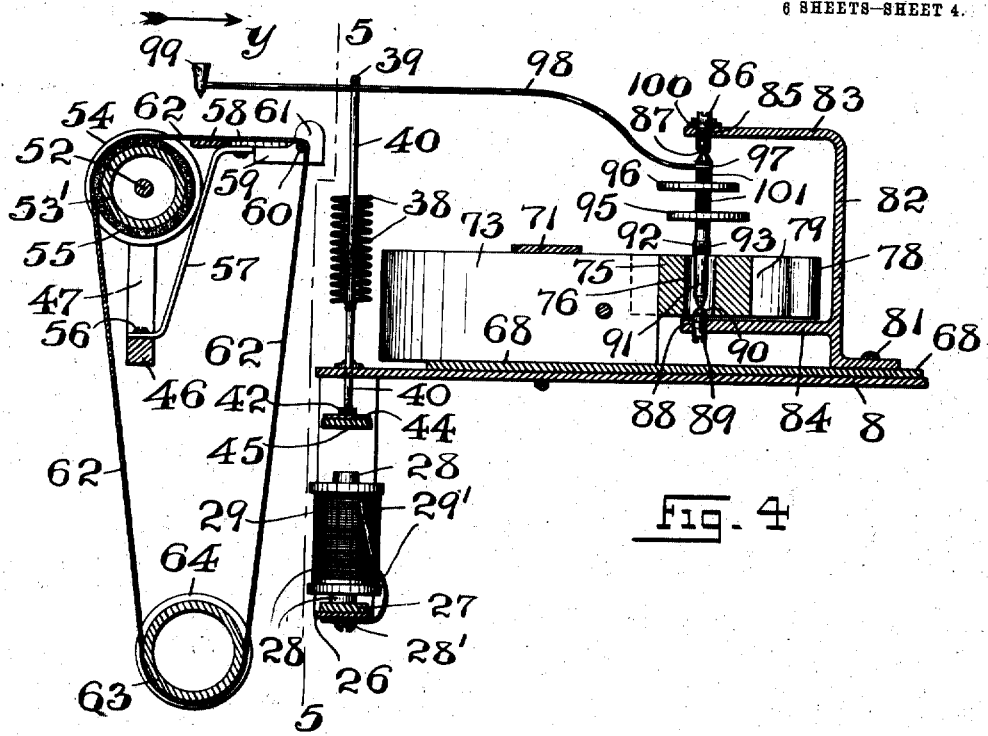
Figure 5:
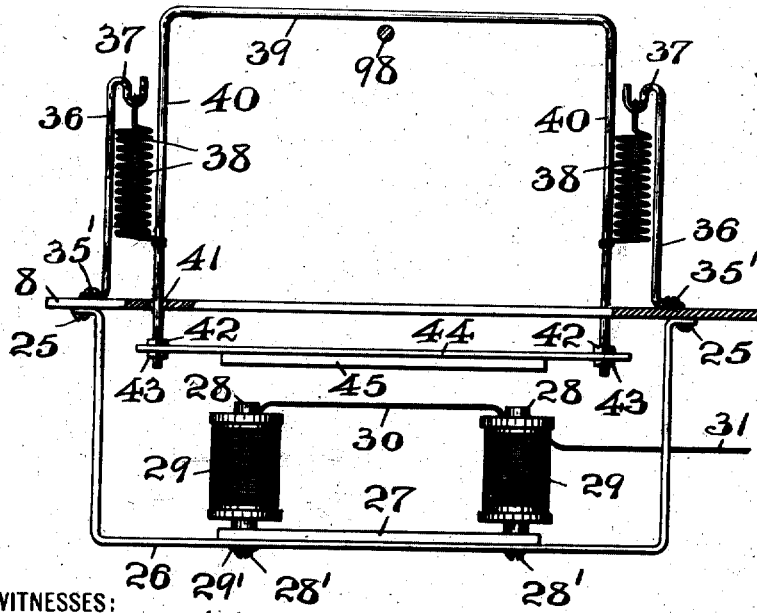
Figure 6:
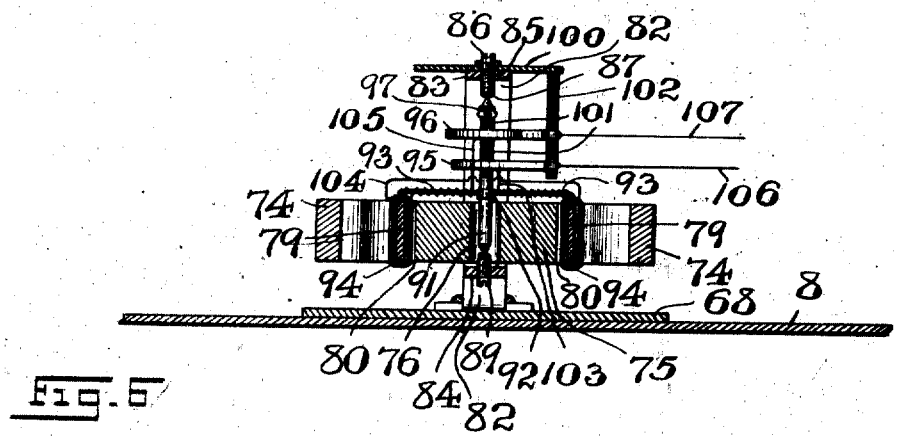
Figure 7:
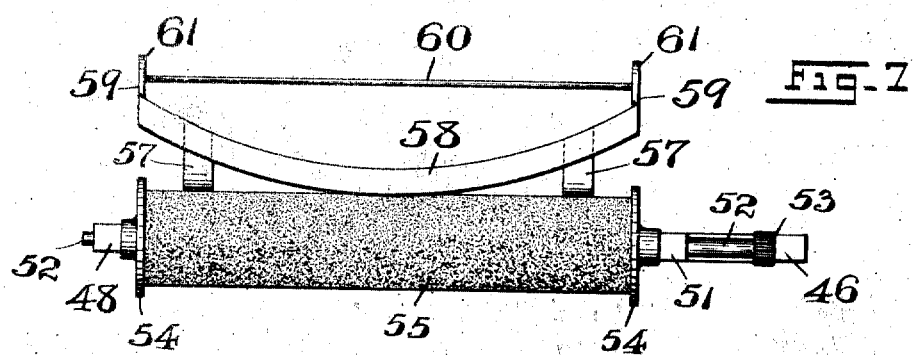
Figure 8:
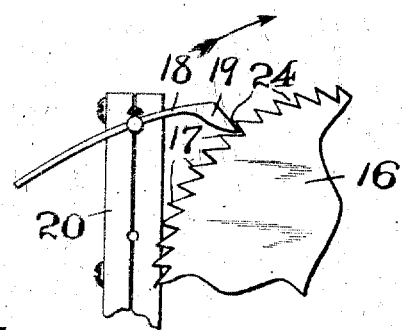
Figure 9:
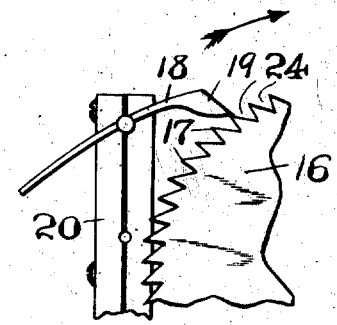
Figure 10:
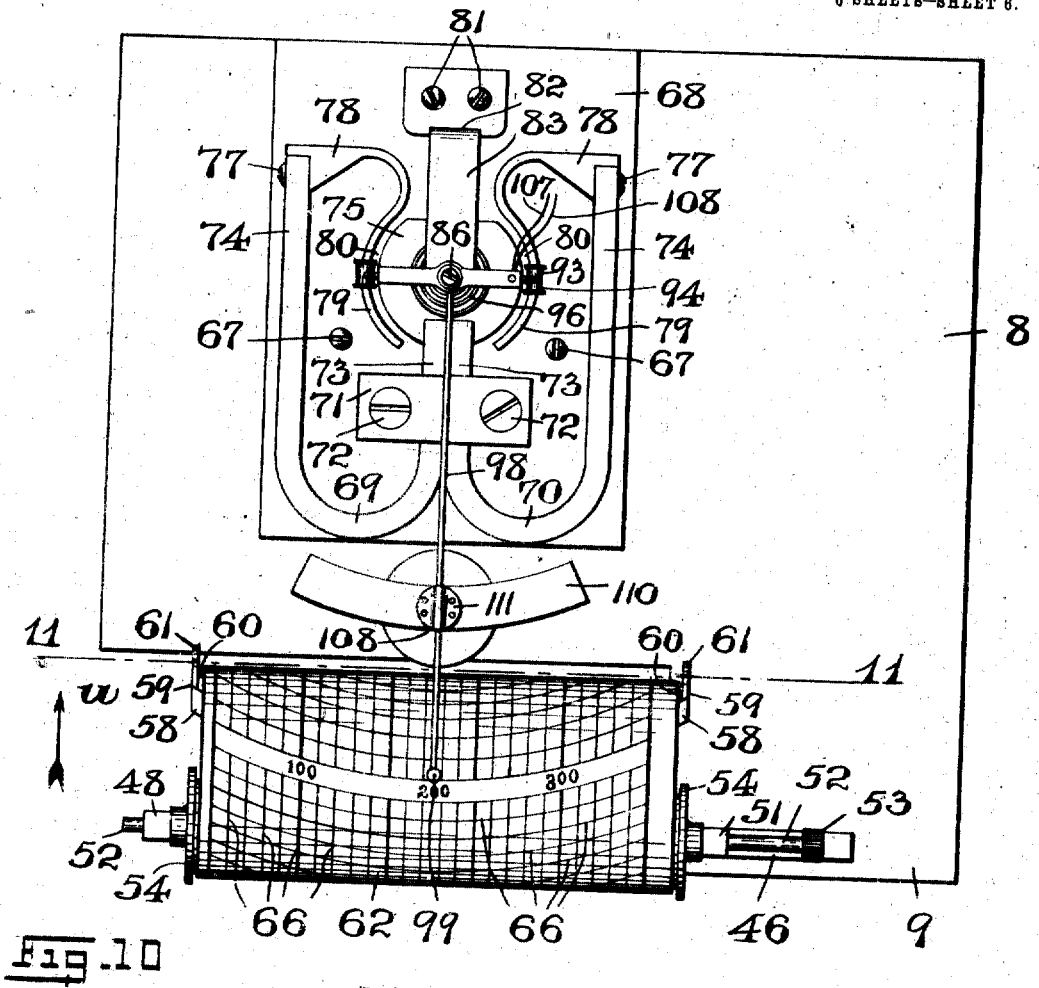
Figure 11:
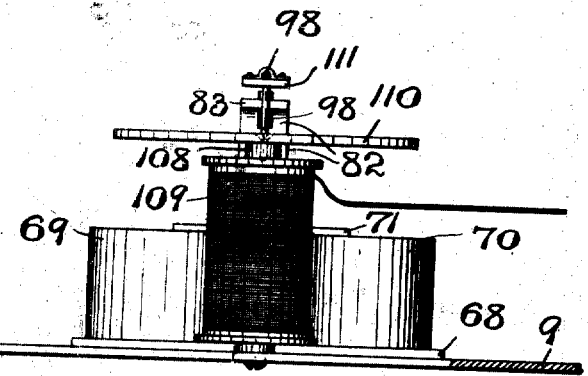

Figure 1 is a front elevation of an electrical recording-indicator embodying one form of the principles of the present invention, showing the apparatus in its position within a cabinet or case, usually provided with a glass door; the door, however, having been omitted from this view. Fig. 2 is a plan or top view of the electrical recording-indicator, with the cabinet or casing represented in horizontal section. Fig. 3 is a transverse vertical section, taken on line 3—3 in said Fig. 1, looking in the direction of the arrow $x$. Fig. 4 is a transverse vertical section of the electrical recording-indicator, said section being taken on line 4—4 in said Fig. 1, also looking in the direction of the arrow $x$, with the cabinet or casing omitted from said view; and Fig. 5 is a detail vertical section taken on line 5—5 in said Fig. 4, looking in the direction of the arrow $y$, certain parts of the mechanism being omitted from said view. Fig. 6 is a transverse vertical section taken on line 6—6 in said Fig. 2, looking in the direction of the arrow $z$. Fig. 7 is a plan view of a feed-roll and guide for the record-sheet used with the apparatus; and Figs. 8 and 9 are detail views of portions of a toothed or serrated wheel forming part of the contact-making and breaking clock-work, said views showing in connection therewith portions of a post, and a spring-like contact-establishing and breaking means rigidly connected with said posts, said means in Fig. 8 being represented out of electrical contact with said toothed or serrated wheel, and in said Fig. 9 being represented in its position when making electrical contact. Fig. 10 is a top or plan view of a recording indicator of a slightly modified construction, but still embodying the principles of the present invention; and Fig. 11 is a transverse vertical section of the same, said section being taken on line 11—11 in said Fig. 10, looking in the direction of the arrow $u$.

Similar characters of reference are employed in all of the above described views, to indicate corresponding parts.

Referring now to the said drawings, the reference-character 1 indicates any suitably constructed case or cabinet, which comprises a base 2, sides 3, a top 4, and a rear wall or back 5, the open front of the cabinet or case being usually provided with a glass-door, not shown in the accompanying drawings.

Suitably secured upon the inner faces of the sides 3 of the cabinet or case, by means of screws 6, or other suitable fastening devices, are cleats, as 7, and slidably arranged upon said cleats, so as to be capable of removal from within the cabinet or case, is a metal plate 8 which provides both a shelf, and also a base-plate, upon which the greater portion of the mechanism of the recording-indicator is arranged in the manner and for the purposes to be presently more fully set forth. The said shelf or base-plate 8 is preferably of the configuration shown in Fig. 2 of the drawings, being provided with a forwardly extending part, as 9. Suitably mounted upon said base-plate, and upon said part 9 thereof, is the frame-work 10 of any suitably constructed clock-work 11, of which the reference-character 12 indicates the usual geared or toothed-disks provided with the boxes 13 and winding-arbors 14, the usual operating springs being arranged within said boxes 13 and being connected with said arbors 14, in any usual and well-known manner.

The clock-work or mechanism is provided with a spindle 15 which is driven from said toothed disks 12 by means of intermediately disposed gears, in the manner usual with the construction of clock-work, said spindle 15 having suitably mounted and secured thereon a disk or wheel 16, which shall be hereinafter termed the contact-making and breaking disk, and which is provided with peripheral serrations or teeth, as 17, for making and breaking electrical contact at predetermined intervals with a spring-contact or arm 18 formed at one of its free ends with a contact-making element or member 19. This spring-contact or arm 18 is fixed to a standard or post 20, which is secured to the part 9 of said shelf or base-plate 8 by means of a screw 21, or other suitable fastening means, said post as well as said screw 21 being suitably insulated from the said shelf or base-plate 8 by means of devices or washers, as 22 and 23 which are made of fiber, or other suitable insulating material. The normal initial position of the spring-contact or arm 18 is that shown more particularly in Fig. 8 of the drawings, and the space 24 between each pair of serrations or teeth 17 of the disk or wheel 16 is such, that the contact-making element 19 will enter the said space 24 without touching any portions of said teeth or the disk, as shown in said Fig. 8, but will intermittently engage with the said teeth, so as to establish electrical contact, as indicated in Fig. 9 of the drawings, when the disk or wheel 16 is moved in the direction of the arrows shown in connection with said Figs. 8 and 9. Suitably secured upon the lower face of said shelf or base-plate 8, by means of screws 25, or other suitable fastening means, and as more clearly illustrated in Fig. 5 of the drawings, is a U-shaped frame 26. Suitably mounted upon said frame 26 is a magnetic bar or plate 27, from which extend, upwardly, a pair of magnetic cores 28 of a pair of energizing coils 29, one of said coils being connected by means of the wire 29[1] to a screw 28[1] by means of which said core 28 is secured in place. These wire-wound coils are connected in circuit by means of a wire 30, another wire 31 leading from one of said coils, to the binding-post 33 of a battery, as 32, which is usually placed upon the bottom or base 2 of the cabinet or case 1. A circuit-wire 34 is attached to the other binding-post 35 of said battery, said wire 34 leading to and being attached to the previously mentioned screw 21, by means of which the standard or post 20 is secured in place. It will thus be evident, that every time the element or member 19 is brought in slidable engagement with a tooth or serration 17 of said disk or wheel 16 an electric circuit is established, whereby the coils 29 are energized and the cores 28 become magnetic. Suitably secured upon the upper face of said shelf or base-plate 8, by means of screws 35[1], or in any other suitable manner, are a pair of posts 36, each post 36 being formed at its upper free end with a hook-shaped end-portion 37, or other suitably formed attaching means. Suitably attached to each hook-shaped end-portion 37 is a coiled spring 38, said springs extending downwardly and having their lower end-portions permanently secured to downwardly extending rods or arms 40 of a ⌐⌐-shaped frame 39. The said rods or arms 40 extend into and through correspondingly located holes or perforations 41 in the shelf or base-plate 8, the end-portions of said rods or arms 40 which project beneath the lower face of said shelf or base-plate 8 having suitably secured thereto, by means of nuts 42 and 43, or in any other manner, a cross-bar or plate 44. Suitably secured to the lower face of said bar or plate 44 is an armature 45 which is attracted by the cores 28, when the latter are rendered magnetic, so as to distend the coils of the springs 38, and at the same time move the ⌐⌐-shaped frame 39 in a downward direction, as will be clearly evident. As soon as the electrical circuit is interrupted, the springs 38 will assume their normal initial positions, whereby the said frame 39, and the parts carried by said frame will again move upwardly into their normal positions, indicated in said Fig. 5 of the drawings.

Referring now to Figs. 1, 2, 3 and 4 of the drawings, it will be seen, that there is secured preferably upon the upper face of the portion 9 of the shelf or base-plate 8, preferably by means of screws 45¹, although other fastening means may be employed, a bar 46 which is provided with an upwardly extending member 47 formed with a suitable bearing-portion 48. A post or standard 49 is also secured to said bar 46 by means of a screw 50, or other suitable fastening means, said post or standard 49 being also formed in its upper part with a suitable bearing-portion 51. Mounted in the said bearing-portions 48 and 51 is a shaft or spindle 52, to which is secured a pinion 53, said pinion being in mesh with the gear-teeth of one of the said driving disks 12 of the clock-work. Upon that portion of the shaft or spindle 52 which is located between said bearing-portions 48 and 51 is a roller or cylinder 53¹ formed at its ends with annular guides or flanges 54, and the cylindrical body of said roller being preferably surrounded by any suitable material 55 having a rough feeding surface, such as sand-paper, emery-paper, emery-cloth, or the like. Also suitably secured to said bar 46, by means of screws 56, or other fastening means, are upwardly projecting brackets or supports, as 57, said brackets or supports carrying a suitably formed supporting plate or table 58. Extending rearwardly from the ends of said plate or table are bracket-like members or elements 59 which are connected by means of a rod or bar 60. Each member or element 59 may also be formed with an upwardly extending guide 61. The reference-character 62 indicates a suitable record-sheet, which is usually made in the form of an endless-belt, and is adapted to be slipped over the end of said roller, or cylinder 53 and said table 58 and rod 60, so as to be operatively arranged between the guiding flanges of said roller or cylinder 53 and said rod 60, substantially in the manner illustrated in the several figures of the drawings. The said record-sheet being thus operatively disposed upon the rough surface of the roll or cylinder 53, the said record-sheet is maintained taut, so that it will readily move with the revolutions of said roll or cylinder 53, by the arrangement of a second roll or cylinder 63, which is also provided with guides or flanges, as 64, in the lower looped part of said sheet, as clearly illustrated, the purposes of which are clearly evident. As shown, the said record-sheet is provided upon one of its faces with longitudinally extending straight lines, as 65, and with arc-shaped lines 66, the spaces between said lines 65 representing graphically divisions indicating degrees of temperature, and the spaces between said lines 66 indicating graphically divisions of time, of any suitable and predetermined lengths. Suitably secured upon said shelf or base-plate 8, by means of screws 67, or in any other well-known manner, is an electrical heat-measuring device of the general construction set forth in my former application for Letters-Patent, filed May 21, 1909, Serial Number 477,419. This device consists, essentially, of a base-plate 68, and suitably secured upon said plate 68 are a pair of horse-shoe magnets 69 and 70, each magnet being firmly secured in its operative position by means of a perforated plate 71 and the screws 72, the lower screw-threaded end-portions being screwed into the said plate 68, and also preferably into the main shelf or support 8. Each magnet, as will be seen more particularly from an inspection of Fig. 1 of the drawings, comprises a short arm or pole-member 73 and a long arm or pole-member 74. In practice these short pole-members 73 are placed adjacent to each other, their free ends being suitably connected with a metal block 75, which forms one of the poles of each magnet, said block being formed with a centrally disposed and vertically extending hole or opening, as 76. Suitably secured to the long-pole-members 74 by means of screws 77, or in any other desirable manner, are elements 78, each element 78 being formed with an arc-shaped pole-member or portion 79. The said members 79 extend on opposite sides of the block 75, the concave surface-portions of said members 79 conforming to the convex surface-portions of the block 75, and the parts owing to their arrangement forming the spaces or air-gaps 80, substantially as shown.

Suitably secured upon the base-plate 68, by means of screws 81, or other suitable fastening means, is a post or standard 82 which is formed with the arms 83 and 84. The said arm 83 is provided with a screw-threaded hole 85 in which is adjustably arranged a screw-threaded bearing-plug 86 provided in its end-portion with a jewel-bearing 87. In a like manner, the arm 84 is formed with a screw-threaded hole 88 in which is adjustably arranged a screw-threaded bearing-plug 89 also provided in its end-portion with a jewel-bearing 90.

As shown, a spindle 91 having its ends pointed is mounted between said jewel bearings 87 and 90, said spindle 91 having suitably secured thereon an eye-portion 92, and extending from the opposite edge-portions of the same are suitable carriers or arms 93. Suspended from the free ends of said carriers or arms are suitable wire-wound energizing coils 94, each coil encompassing and being movably mounted upon a curved or arc-shaped pole-member 79, as will be evident from an inspection of Figs. 1 and 6 of the drawings. Suitably mounted upon the said spindle 91 are a pair of torsional springs 95 and 96, and the collar or eye-portion 97 of the arm 98 of a suitable stylus.

This arm 98, which is preferably bent in the manner shown in Fig. 4 of the drawings, extends forwardly and directly beneath the previously mentioned ⊓-shaped frame 39, the free end-portion of the arm 98 terminating in a holder 99 for the pencil, said holder being located directly above the arc-shaped supporting plate or table 58, for marking by means of said pencil upon the record-sheet, as it moves over said plate or table 58.

The various portions which are mounted upon the spindle 91 are suitably insulated from each other by means of insulating sleeves 101. A plate or bar 100 is also secured upon the upper arm 83 of the standard 82, by means of the previously-mentioned screw-threaded plug 86, and extending downwardly from said plate or bar 100 is a stem 102, of suitable insulating material, and with which the outer end-portions of said torsional springs 95 and 96 are suitably connected.

Connected with and extending from a portion of the spring 95 is a suitably covered or insulated circuit-wire 103, a portion of which is wound around one of the said carriers or arms 93, and is connected with the energizing coil 94 suspended from said carrier or arm 93. The said energizing coil is placed in circuit with the other energizing coil by means of a connecting circuit-wire 104, and said last-mentioned coil is connected by means of a circuit-wire 105 with the other spring 96, said wire 105 being wound around the other carrier or arm 93 and being secured at its end to the said spring 96. Leading-out circuit wires 106 and 107 are respectively secured to the portions of the springs 95 and 96 which are secured to the stem 102, said leading-out wires 106 and 107 being passed either through the back or a side of the cabinet or casing, as will be clearly understood, but not shown in the present drawings, and being placed in circuit with any suitable source of electrical resistance, as a thermo-electric couple.

The operation of the electrical heat-measuring device, just described, is self-evident, the purpose being to produce swinging movements of the stylus; and, the electrical make and break device which intermittently produces the downward movements of said ⊓-shaped frame 39, causes said frame to engage the stylus so that the latter, at the pre-determined intervals, will be pressed downwardly whereby the pencil of the stylus, no matter in whatever position the stylus may have been moved, is forced against the record-sheet to produce a point or mark thereon, and where it is held until the springs 38 are freed to return the frame 39 once more in its upward direction, and whereby the stylus again is free to swing to another position, in which it can again be depressed and held to produce another point or marking upon the record-sheet.

In lieu of the electro-magnets 29 and their cores 28, the frame 26, the movable frame 39, the springs 38, and the armature 45 carried by said frame 39, a core 108 may be secured upon the upper face of the shelf 8, the said core 108 being surrounded by a wire-wound coil 109 which is placed in circuit with the battery, in the manner previously described. The core 108 which extends above the coil 109 is provided upon its projecting end with an arc-shaped plate 110, and the arm 98 of the stylus has suitably secured thereon a disk or other suitably shaped armature, as 111, which is attracted by the said arc-shaped plate 110, when the core 108 and said plate 110 are rendered magnetic, as will be clearly understood from an inspection of the modification shown in Figs. 10 and 11 of the drawings, and for the purposes set forth in the foregoing description.

The remaining parts of the apparatus are the same as those described in connection with Figs. 1, 2, 3, 4, 6, 7, 8 and 9 of the drawings, and need, therefore, not be further described.

I am aware that some changes may be made in the arrangements and combinations of the various devices and parts, as well as in the details of the construction of the same, without departing from the scope of the present invention as described in the foregoing specification, and as defined in the claims which are appended thereto. Hence, I do not limit my present invention to the exact arrangements and combinations of the devices and parts as set forth in the said specification, nor do I confine myself to the exact details of the constructions of the said parts as illustrated in the accompanying drawings.

I claim:—

1. In a recording-indicator, the combination with a heat-measuring device provided with a swinging stylus, of a record-sheet, supporting means, mechanically operating mechanism for actuating said supporting means, a make and break device connected with said mechanically operating mechanism, an electro-magnet in circuit with said make and break device, a vertically movable frame, and an armature connected with said frame, said frame being provided with a cross-bar adapted to be brought down into holding engagement with said stylus, for intermittently arresting the swinging movements of said stylus and simultaneously depressing said stylus upon the record-sheet.

2. In a recording-indicator, the combination with a heat-measuring device provided with a swinging stylus, of a record-sheet supporting means, mechanically operating mechanism for actuating said supporting means, a make and break device connected with said mechanically operating mechanism, an electro-magnet in circuit with said make and break device, a vertically movable frame, and an armature connected with said frame, said frame being provided with a cross-bar adapted to be brought down into holding engagement with said stylus, for intermittently arresting the swinging movements of said stylus and simultaneously depressing said stylus upon the record sheet, when an electric circuit is established by means of said make and break device, and springs connected with said frame, for returning the latter and said armature upwardly to their normal initial positions when the electrical circuit is interrupted.

3. In a recording-indicator, the combination with a heat-measuring device provided with a swinging stylus, of a record-sheet supporting means, mechanically operating mechanism for actuating said supporting means, a toothed disk connected with and operated by said mechanically operating mechanism, a post, and a spring-like dog secured to said post and adapted to make and break electrical contact with the toothed portions of said disk, an electro-magnet in circuit with said disk, a vertically movable frame, and an armature connected with said frame, said frame being provided with a cross-bar adapted to be brought down into holding engagement with said stylus, for intermittently arresting the swinging movements of said stylus and simultaneously depressing said stylus upon the record-sheet.

4. In a recording-indicator, the combination with a heat-measuring device provided with a swinging stylus, of a record-sheet supporting means, mechanically operating mechanism for actuating said supporting means, a toothed disk connected with and operated by said mechanically operating mechanism, a post, and a spring-like dog secured to said post and adapted to make and break electrical contact with the toothed portions of said disk, an electro-magnet in circuit with said disk, a vertically movable frame, an armature connected with said frame, said frame being provided with a cross-bar adapted to be brought down into holding engagement with said stylus, for intermittently arresting the swinging movements of said stylus and simultaneously depressing said stylus upon the record-sheet, when an electric circuit is established by means of said spring-like dog with said toothed disk, and springs connected with said last-mentioned frame, for returning the latter and said armature upwardly to their normal initial positions when the electrical contact is interrupted.

5. In a recording-indicator, the combination with a shelf forming a base-plate, of a heat-measuring device secured upon said shelf, said device being provided with a swinging stylus, a record-sheet supporting means mounted upon said shelf, said means comprising a frame, a pair of bearing-portions connected with said frame, a spindle rotatably mounted in said bearing-portions, a pinion on said spindle, a table-like member connected with said frame, a cylinder upon said spindle, and a record-sheet movably arranged over said cylinder and said table-like member, a clock-mechanism also mounted upon said shelf, a spring-controlled gear-wheel connected with said clock-work in mesh with said pinion for operating said record-sheet supporting cylinder, a make and break device connected with said clock-mechanism, a frame secured to the under side of said shell, an electro-magnet mounted upon said frame and in circuit with said make and break device, a second and a vertically movable frame upon the upper side of said shelf, and an armature connected with said movable frame, said movable frame being provided with a cross-bar adapted to be brought in engagement with said stylus, for intermittently arresting the swinging movements of said stylus and simultaneously depressing said stylus upon the record-sheet.

6. In a recording-indicator, the combination with a shelf forming a base-plate, of a heat-measuring device secured upon said shelf, said device being provided with a swinging stylus, a record-sheet supporting means mounted upon said shalf, said means comprising a frame, a pair of bearing-portions connected with said frame, a spindle rotatably mounted in said bearing-portions, a pinion on said spindle, a table-like member connected with said frame, a cylinder upon said spindle, and a record-sheet movably arranged over said cylinder and said table-like member, a clock-mechanism also mounted upon said shelf, a spring-controlled gear-wheel connected with said clock-work in mesh with said pinion for operating said record-sheet supporting cylinder, a make and break device connected with said clock-mechanism, a frame secured to the under side of said shelf, an electro-magnet mounted upon said frame and in circuit with said make and break device, a second and a vertically movable frame upon the upper side of said shelf, and an armature connected with said movable frame, said movable frame being provided with a cross-bar adapted to be brought down into holding engagement with said stylus, for intermittently arresting the swinging movements of said stylus and simultaneously depressing said stylus upon the record-sheet, when an electric circuit is established by means of said make and break device, and springs connected with said frame, for returning the latter and said armature upwardly to their normal initial positions when the electrical circuit is interrupted.

7. In a recording-indicator, the combination with a shelf forming a base-plate, of a heat-measuring device secured upon said shelf, said device being provided with a swinging stylus, a record-sheet supporting means mounted upon said shelf, said means comprising a frame, a pair of bearing-portions connected with said frame, a spindle rotatably mounted in said bearing-portions, a pinion on said spindle, a table-like member connected with said frame, a cylinder upon said spindle, and a record-sheet movably arranged over said cylinder and said table-like member, a clock-mechanism also mounted upon said shelf, a spring-controlled gear-wheel connected with said clock-work in mesh with said pinion for operating said record-sheet supporting cylinder, a toothed disk connected with and operated by said clock-work, a post upon said shelf, a spring-like dog adapted to make and break electrical contact with the toothed portions of said disk, a frame secured to the under side of said shelf, an electro-magnet mounted upon said frame and in circuit with said post, a second and a vertically movable frame upon the upper side of said shelf, an armature connected with said movable frame, said movable frame being provided with a cross-bar adapted to be brought down into holding engagement with said stylus, for intermittently arresting the swinging movements of said stylus and simultaneously depressing said stylus upon the record sheet.

8. In a recording-indicator, the combination with a shelf forming a base-plate, of a heat-measuring device secured upon said shelf, said device being provided with a swinging stylus, a record-sheet supporting means mounted upon said shelf, said means comprising a frame, a pair of bearing-portions connected with said frame, a spindle rotatably mounted in said bearing-portions, a pinion on said spindle, a table-like member connected with said frame, a cylinder upon said spindle, and a record-sheet movably arranged over said cylinder and said table-like member, a clock-mechanism also mounted upon said shelf, a spring-controlled gear-wheel connected with said clock-work in mesh with said pinion for operating said record-sheet supporting cylinder, a toothed disk connected with and operated by said clock-work, a post upon said shelf, and a spring-like dog adapted to make and break electrical contact with the toothed portions of said disk, a frame secured to the under side of said shelf, an electro-magnet mounted upon said frame and in circuit with said post, a second and a vertically movable frame upon the upper side of said shelf, an armature connected with said movable frame, said movable frame being provided with a cross-bar adapted to be brought down into holding engagement with said stylus, for intermittently arresting the swinging movements of said stylus and simultaneously depressing said stylus upon the record sheet, when an electric circuit is established by means of said spring-like dog with said toothed disk, and springs connected with said last-mentioned frame, for returning the latter and said armature to their normal initial positions when the electrical contact is interrupted.

9. In a recording-indicator, the combination with a shelf forming a base-plate, of a heat-measuring device provided with a swinging stylus, of a record-sheet supporting means, mechanically operating mechanism for actuating said supporting means, a toothed disk connected with and operated by said mechanically operating mechanism, a post secured to and extending upwardly from said shelf, a spring-like dog secured to said post and adapted to make and break electrical contact with the toothed portions of said disk, an electro-magnet in circuit with said disk, a pair of posts secured to and extending upwardly from said shelf, each post being provided at its upper end with a hook-shaped portion, a vertically movable frame between said pair of posts, a coiled spring suspended from each hook-shaped portion, said springs being secured to said movable frame for suspending it from said pair of posts, and an armature connected with said frame, said frame being provided with a cross-bar adapted to be brought into holding engagement with said stylus, for intermittently arresting the swinging movements of said stylus and simultaneously depressing said stylus upon the record-sheet.

10. In a recording-indicator, the combination with a shelf forming a base-plate, of a heat-measuring device secured upon said shelf, said device being provided with a swinging stylus, a record-sheet supporting means mounted upon said shelf, said means comprising a frame, a pair of bearing-portions connected with said frame, a spindle rotatably mounted in said bearing-portions, a pinion on said spindle, a table-like member connected with said frame, a cylinder upon said spindle, and a record-sheet movably arranged over said cylinder and said table-like member, a clock-mechanism also mounted upon said shelf, a spring-controlled gear-wheel connected with said clock-work in mesh with said pinion for operating said record-sheet supporting cylinder, a make and break device connected with said clock-work, an electro-magnet in circuit with said make and break device, a pair of posts secured to and extending upwardly from said shelf, each post being provided at its upper end with a hook-shaped portion, a frame movably arranged between said posts, a coiled spring suspended from each hook-shaped portion, said springs being secured to said movable frame for suspending it from said posts, and an armature connected with said frame, said frame being provided with a bar adapted to be brought into holding engagement with said stylus, for intermittently arresting the swinging movements of said stylus and simultaneously depressing said stylus upon the record sheet.

11. In a recording-indicator, the combination with a shelf forming a base-plate, of a heat-measuring device secured upon said shelf, said device being provided with a swinging stylus, a record-sheet supporting means mounted upon said shelf, said means comprising a frame, a pair of bearing-portions connected with said frame, a spindle rotatably mounted in said bearing-portions, a pinion on said spindle, a table-like member connected with said frame, a cylinder upon said spindle, and a record-sheet movably arranged over said cylinder and said table-like member, a clock-mechanism also mounted upon said shelf, a spring-controlled gear-wheel connected with said clock-work in mesh with said pinion for operating said record-sheet supporting cylinder, a make and break device connected with said clock-work, a toothed disk connected with and operated by said clock-work, a post secured to and extending upwardly from said shelf, a spring-like dog secured to said post and adapted to make and break electrical contact with the toothed portions of said disk, an electro-magnet in circuit with said disk, a pair of posts secured to and extending upwardly from said shelf, each post being provided at its upper end with a hook-shaped portion, a frame movably arranged between said pair of posts, a coiled spring suspended from each hook-shaped portion, said springs being secured to said movable frame for suspending it from said pair of posts, and an armature connected with said frame, said frame being provided with a cross-bar adapted to be brought into holding engagement with said stylus, for intermittently arresting the swinging movements of said stylus and simultaneously depressing said stylus upon the record-sheet.

12. In a recording-indicator, a frame provided with bearing-portions, a spindle rotatably mounted in said bearing-portions, a cylinder upon said spindle, said cylinder being provided with a rough feeding surface, and an endless belt-like record-sheet mounted upon said cylinder, combined with a second cylinder arranged and supported in the lower looped portion of said belt-like record-sheet, and both of said cylinders being provided with guiding flanges.

In testimony, that I claim the invention set forth above I have hereunto set my hand this 28th day of March, 1910.

JOHN L. ZANDER.

Witnesses:
FREDK. C. FRAENTZEL,
FREDK. H. W. FRAENTZEL.